US012654411B2

(12) United States Patent (10) Patent No.: US 12,654,411 B2

Fresch et al. (45) Date of Patent: Jun. 16, 2026

(54) PROCEDURE FOR PRODUCING A MULTI-COMPOUND TREAD FOR ROAD VEHICLE TIRES

(71) Applicant: Bridgestone Europe NV/SA [BE/BE], Zaventem (BE)

(72) Inventors: Enrico Fresch, Rome (IT); Alessandra Bartoloni, Rome (IT); Andrea Sabella, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 770 days.

(21) Appl. No.: 17/772,708

(22) PCT Filed: Oct. 23, 2020

(86) PCT No.: PCT/IB2020/059965

§ 371 (c)(1),
(2) Date: Apr. 28, 2022

(87) PCT Pub. No.: WO2021/084392

PCT Pub. Date: May 6, 2021

(65) Prior Publication Data

US 2023/0001660 A1 Jan. 5, 2023

(30) Foreign Application Priority Data

Oct. 29, 2019 (IT) ........................ 102019000019946

(51) Int. Cl.
B29D 30/52 (2006.01)
B60C 11/00 (2006.01)
(52) U.S. Cl.
CPC .......... B29D 30/52 (2013.01); B60C 11/0008 (2013.01); B60C 2011/0025 (2013.01)

(58) Field of Classification Search
CPC ........ B29D 30/52; B29D 30/60; B29D 30/62; B29D 30/68; B29D 2030/526;
(Continued)

(56) References Cited

U.S. PATENT DOCUMENTS 2,207,100 A 7/1940 Maynard
2002/0069948 A1 6/2002 Sentmanat
(Continued)

FOREIGN PATENT DOCUMENTS

CN 102753360 A 10/2012
CN 104220277 A 12/2014
(Continued)

OTHER PUBLICATIONS

Komischke R, DE-102006038742-A1, machine translation. (Year: 2008).*
(Continued)

*Primary Examiner* — Sedef E Paquette
(74) *Attorney, Agent, or Firm* — Patterson Intellectual Property Law, PC

(57) ABSTRACT

A process for the manufacture of a tread band, wherein the blocks thereof include different portions having differing hysteresis losses. The process includes a step for the extrusion of a preliminary tread band consisting of a first rubber compound and an injection step, wherein the preliminary tread band, once extruded, is subjected to the action of at least one injector arranged such as to penetrate into the layer of the preliminary tread band and to release a second rubber compound, which is distributed within the layer consisting of the first compound, maintaining exposed a surface that is suitable for defining a portion of the ground-contacting surface of the resulting tread band.

5 Claims, 1 Drawing Sheet

(58) Field of Classification Search

CPC .......... B29D 2030/685; B60C 11/0008; B60C 2011/0025; B60C 19/08; B60C 19/082

USPC .................. 425/28.1; 156/110.1, 127, 128.6

See application file for complete search history.

(56) References Cited

U.S. PATENT DOCUMENTS

| | | |
|---|---|---|
| 2008/0149260 A1 | 6/2008 | Orsat |
| 2016/0016435 A1 | 1/2016 | Volk et al. |

FOREIGN PATENT DOCUMENTS

| | | | | | |
|---|---|---|---|---|---|
| CN | 107531098 A | | 1/2018 | | |
| DE | 102006038742 A1 | * | 2/2008 | ............ | B29D 30/52 |
| EP | 881060 A2 | * | 12/1998 | ............ | B29D 30/52 |
| EP | 1213130 A2 | | 11/2001 | | |
| JP | H106176 A | * | 1/1998 | | |
| JP | H11180108 A | * | 7/1999 | | |
| JP | 2000079805 A | * | 3/2000 | | |
| JP | 2001105510 A | | 4/2001 | | |
| JP | 2005199922 A | | 7/2005 | | |
| JP | 2005336347 A | * | 12/2005 | | |
| JP | 2006124459 A | * | 5/2006 | | |
| JP | 2008143486 A | * | 6/2008 | | |
| JP | 2008525216 A | | 7/2008 | | |
| JP | 2017217961 A | | 12/2017 | | |
| JP | 2019521908 A | | 8/2019 | | |
| KR | 100318042 B1 | * | 12/2001 | ....... | B29C 45/14467 |
| WO | 2019198048 A1 | | 10/2019 | | |

OTHER PUBLICATIONS

Lim Ho-taek, KR-100318042-B1, machine translation. (Year: 2001).*

Tsumori Isamu, JP-H11180108-A, machine translation. (Year: 1999).*

Shirasaka Jingo, JP-2005336347-A, machine translation. (Year: 2005).*

Morii Takao, JP-2008143486-A, machine translation. (Year: 2008).*

Sato Akihiro, JP-H106176-A machine translation. (Year: 1998).*

Tsumori Isamu, JP-2000079805-A, machine translation. (Year: 2000).*

Inamura Tomomi, JP-2006124459-A, machine translation. (Year: 2006).*

International Search Report: Search report for corresponding International Application No. PCT/IB2020/059965 dated Jan. 12, 2021, 3 pages.

Haris, Muhammad, Sustainable Tire Rubber—A Comparison of Silica and Carbon Black Filled Tread Compounds Using DMA, TA Instruments—Applications Notes, Jun. 2023.

Warasitthinon, Nuthathai & Robertson, Christopher. (2018). Interpretation of the tand peak height for particle-filled rubber and polymer nanocomposites with relevance to tire tread performance balance. Rubber Chemistry and Technology. 91. 10.5254/rct.18. 82608.

Terrill, Edward, et al., Passenger Tire Rolling Resistance, Safety, and Fuel Economy: Tread Compound Report Phase 2 (Feb. 2010), Nat'l Highway Traffic Safety Admin.

* cited by examiner

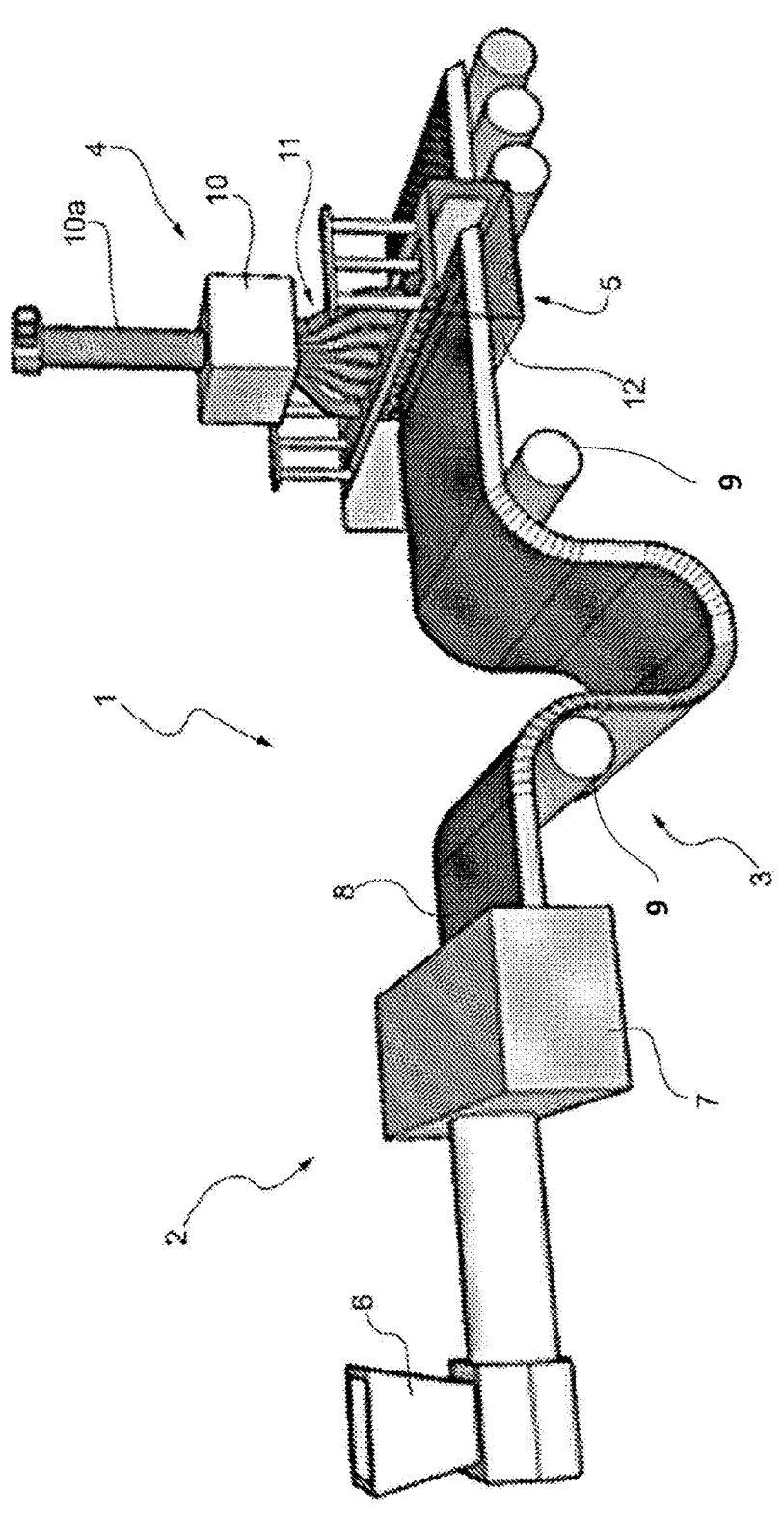

PROCEDURE FOR PRODUCING A MULTI-COMPOUND TREAD FOR ROAD VEHICLE TIRES

The present invention relates to a process for the manufacture of a multi-compound tread for pneumatic tires for road vehicles.

In the field of pneumatic tires for road vehicles, it is known that low rolling resistance and good wet grip performance are characteristics that are difficult to reconcile within the same tread. In fact, while in order to confer good rolling resistance to a pneumatic tire treads that are manufactured with compounds with a low hysteresis loss are used, in order to confer good wet grip performance to a pneumatic tire compounds having a relatively higher hysteresis loss become necessary.

Consequently, an optimal tread compound for simultaneously enhancing all dynamic responses should exhibit opposing hysteresis characteristics, at least over certain required performance limits.

It is known that the properties of the aforementioned rubber compound influence not only the balance between wet grip performance/rolling resistance, but also other performance of the pneumatic tire, such as the balance between winter/wet grip performance.

As is known, the tread is composed of a plurality of blocks, which are elements that are delimited by a plurality of grooves that are formed within the tread. These grooves may have differing dimensions depending upon the function that they must fulfill. For example, when the grooves are small in size they are called blades and are intended to provide greater grip on snow and ice.

In other words, a tread block is a rubber filled portion bounded by a plurality of grooves, independently of whatever the dimensions of the latter may be.

The inventors of the present invention have found that, if the blocks of the tread are composed of different portions manufactured with respective compounds having differing hysteresis losses, it is possible to obtain a synergistic effect that is capable of imparting significant improvements in terms of wet grip performance, without thereby adversely affect the rolling resistance.

The inventors of the present invention have implemented a process and an associated plant in order to be able to manufacture, in an effective and productive manner, a tread comprising blocks composed of different portions having differing hysteresis losses.

The object of the present invention is a process for the manufacture of a tread band, wherein, the blocks thereof comprise different portions having differing hysteresis losses; said process being characterized in that it comprises a step for the extrusion of a preliminary tread band consisting of a first rubber compound and an injection step, wherein the preliminary tread band, once extruded, is subjected to the action of at least one injector arranged such as to penetrate into the layer of the preliminary tread band and to discharge a second rubber compound, which is distributed within the layer consisting of said first compound, maintaining exposed a surface that is suitable for defining a portion of the ground-contacting surface of the resulting tread band; said first and said second compounds having different dynamic properties in terms of: dynamic modulus at 30° C., tan δ at 0° C., tan δ at 30° C. and tan δ at 60° C., said first compound has a dynamic modulus at 30° C. of between 11.0 and 17.0 MPa, a tan δ at 0° C. of between 0.85 and 1.1, a tan δ at 30° C. of between 0.45 and 0.65 and a tan δ at 60° C. of between 0.19 and 0.30; said second compound having a dynamic modulus at 30° C. of between 5.5 and 15 MPa and at least 2 MPa less than that of said first compound, a tan δ at 0° C. of between 0.40 and 0.99 and at least 0.02 less than that of said first compound, a tan δ at 30° C. of between 0.21 and 0.63 and at least 0.02 less than that of said first compound, a tan δ at 60° C. of between 0.10 and 0.28 and at least 0.02 less than that of said first compound.

Preferably, said extrusion step is continuous and said injection step is discontinuous.

Preferably, said process comprises an interconnection step, wherein said preliminary tread band, which is produced continuously, is stopped at intervals in order to then be recovered and subjected to said injection step.

Preferably, said first compound having a dynamic modulus at 30° C. of between 11.0 and 17.0 MPa, a tan δ at 0° C. of between 0.85 and 1.1, a tan δ at 30° C. of between 0.45 and 0.65 and a tan δ at 60° C. of between 0.19 and 0.30, said second compound having a dynamic modulus at 30° C. lower than that of said first compound with a value of between 7.5 and 10.5 MPa, a tan δ at 0° C. lower than that of said first compound with a value of between 0.70 and 0.84, a tan δ at 30° C. lower than that of said first compound with a value of between 0.21 and 0.42 a tan δ at 60° C. lower than that of said first compound with a value of between 0.10 and 0.17.

The dynamic properties were measured in accordance with the ISO 4664 standard. As is known to a person skilled in the art, the tan δ values at 60° C. are strictly correlated to the property of rolling resistance: the lower the tan δ value at 60° C., the better the rolling resistance.

A further object of the present invention is a plant for the manufacture of a tread band wherein the blocks thereof comprise different portions having differing hysteresis losses; said plant being characterized in that it comprises an extrusion station wherein a preliminary tread band is formed, an injection station wherein, within said preliminary tread band portions of a second rubber compound are injected, and movement means that are suitable for moving said preliminary tread band from said extrusion station to said injection station; said extrusion station comprising at least one extruder and at least supply means that are suitable for supplying said extruder with a first rubber compound; said injection station comprising a dispenser (10) of said second rubber compound and a plurality of injectors (11) connected to said dispenser (10) for receiving a determined quantity of said second rubber compound to be injected within said preliminary tread band.

Preferably, said plant comprises an interconnection station, wherein said preliminary tread band is stopped at intervals in order to then be recovered and transported to said injection station.

Below is an exemplary, non-limiting embodiment of the present invention for purposes of illustration with the aid of the attached FIGURE, which illustrates in schematic form a plant, the object of the present invention.

In the FIGURE, there is indicated, in the entirety thereof with 1, the plant, the object of the present invention.

The plant 1 comprises an extrusion station 2, an interconnection station 3, an injection station 4 and movement means 5 responsible for the advancement of a preliminary tread band from the interconnection station 3 to the injection station 4.

The extrusion station 2 comprises a hopper 6, whereinto a first rubber compound is loaded, and an extruder 7 that is capable of producing, with the first rubber compound, a preliminary tread band 8.

The interconnection station 3 comprises two rollers 9 arranged such as to rotate idling and wherebetween a loop is implemented that is variable according to the action of the movement means 5.

The injection station 4 comprises a dispenser 10, connected to a supply line 10a of a second rubber compound and a plurality of injectors 11, wherein each thereof extends from said dispenser 10, from which it receives a determined quantity of the second rubber compound. Each of the injectors 11 has a free dispensing end that is capable of penetrating into the layer of the preliminary tread band and releasing within the layer itself the quantity of the second rubber compound.

The movement means 5 comprise a plurality of rollers 12 that are moved by actuator means (known and not described in detail). In essence, the rollers 12 function as a conveyor belt.

The first and second compounds have differing dynamic properties in terms of: dynamic modulus at 30° C., tan δ at 0° C., tan δ at 30° C. and tan δ at 60° C.

In particular, the first compound has a dynamic modulus at 30° C. of between 11.0 and 17.0 MPa, a tan δ at 0° C. of between 0.85 and 1.1, a tan δ at 30° C. of between 0.45 and 0.65 and a tan δ at 60° C. of between 0.19 and 0.30; whilst the second compound has a dynamic modulus at 30° C. lower than that of the first compound with a value of between 7.5 and 10.5 MPa, a tan δ at 0° C. lower than that of the first compound with a value of between 0.70 and 0.84, a tan δ at 30° C. lower than that of the first compound with a value of between 0.21 and 0.42 a tan δ at 60° C. lower than that of the first compound with a value of between 0.10 and 0.17.

As may appear obvious from the description above, the process and plant of the present invention ensure the effective preparation and high productivity of tread bands, wherein the blocks thereof are composed of parts having differing hysteresis losses.

In this way it will be possible to produce a tread band wherein the technical characteristics thereof are such as to ensure significant improvement effects in terms of wet grip performance, maintaining, at the same time, the advantages obtained in terms of rolling resistance. In particular, the tread band manufactured with the process and plant of the present invention relates to a kind of "multi-pin tread" for winter/all seasons applications. In fact, those elements that are manufactured using the second rubber compound (a stiffer compound) are incorporated into the preliminary tread band, manufactured using the first rubber compound (a softer compound), and act as studs when on roads with ice and snow.

The invention claimed is:

1. A method for manufacture of a tread band wherein a plurality of blocks thereof comprise different portions having differing hysteresis losses, the method comprising:
   an extrusion step of forming, at an extrusion station, a preliminary tread band consisting of a first rubber compound;
   an injection step of injecting, via at least one injector at an injection station, a second rubber compound into the preliminary tread band, once extruded, wherein the at least one injector is arranged such as to penetrate into a layer of the preliminary tread band and to release the second rubber compound, which is distributed within the layer consisting of said first rubber compound, keeping exposed a surface suitably defining a portion of a ground-contacting surface of a resulting tread band;
   wherein said first rubber compound and said second rubber compound have different dynamic properties in terms of dynamic modulus at 30° C., tan δ at 0° C., tan δ at 30° C., and tan δ at 60° C.;
   wherein said first rubber compound has a dynamic modulus at 30° C. of between 11.0 and 17.0 MPa, a tan δ at 0° C. of between 0.85 and 1.1, a tan δ at 30° C. of between 0.45 and 0.65, and a tan δ at 60° C. of between 0.19 and 0.30;
   wherein said second rubber compound has a dynamic modulus at 30° C. of between 5.5 and 15 MPa and at least 2 MPa less than that of said first rubber compound, a tan δ at 0° C. of between 0.40 and 0.99 and at least 0.02 less than that of said first rubber compound, a tan δ at 30° C. of between 0.21 and 0.63 and at least 0.02 less than that of said first rubber compound, a tan δ at 60° C. of between 0.10 and 0.28 and at least 0.02 less than that of said first rubber compound.

2. The method of claim 1, wherein said extrusion step is continuous and said injection step is discontinuous.

3. The method of claim 2, further comprising an interconnection step, wherein said preliminary tread band, which is produced continuously, is stopped at intervals at an interconnection station arranged between the extrusion station and the injection station in order to then be recovered and subjected to said injection step.

4. The method of claim 3, further comprising advancing, via a plurality of rollers, the preliminary tread band from the interconnection station to the injection station.

5. The method of claim 3, further comprising an idling step, wherein at least two rollers arranged at the interconnection station, cooperatively rotate to form a variable loop of the preliminary tread band.

* * * * *